(12) United States Patent
Imai et al.

(10) Patent No.: US 6,856,312 B1
(45) Date of Patent: *Feb. 15, 2005

(54) METHOD FOR GENERATING THREE-DIMENSIONAL FORM DATA AND APPARATUS THEREFOR

(75) Inventors: Shigeaki Imai, Uji (JP); Eiro Fujii, Takatsuki (JP); Koji Fujiwara, Sakai (JP); Yoshiko Sakagawa, Ibaraki (JP); Yoshiko Nakagawa, Suita (JP); Kiri Matsuura, Osaka (JP)

(73) Assignee: Minolta Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/748,935

(22) Filed: Nov. 13, 1996

(30) Foreign Application Priority Data

Nov. 14, 1995 (JP) ............................................. 7-295110

(51) Int. Cl.⁷ .............................................. G06T 15/00
(52) U.S. Cl. ....................................................... 345/419
(58) Field of Search ................................ 345/418, 423, 345/428, 441–3, 419, 420, 425, 442, 443; 304/578

(56) References Cited

U.S. PATENT DOCUMENTS

| | | | |
|---|---|---|---|
| 4,643,578 A | | 2/1987 | Stern ........................... 356/376 |
| 4,731,853 A | | 3/1988 | Hata et al. ....................... 382/1 |
| 4,993,835 A | | 2/1991 | Inoue et al. .................. 356/376 |
| 5,398,293 A | * | 3/1995 | Sato et al. .................... 382/309 |
| 5,615,318 A | * | 3/1997 | Matsuura ..................... 345/419 |
| 5,627,949 A | * | 5/1997 | Letcher, Jr. .................. 345/420 |
| 5,742,291 A | * | 4/1998 | Palm ............................ 345/420 |
| 5,754,680 A | * | 5/1998 | Sato et al. .................... 382/154 |

OTHER PUBLICATIONS

Foley, James D., et al, "Computer Graphics: Principles and Practices", Addison–Wesley Publishing Co., 2nd ed. pp. 479–528, 1990.*

* cited by examiner

Primary Examiner—Thu V. Nguyen
(74) Attorney, Agent, or Firm—McDermott Will & Emery LLP

(57) ABSTRACT

In order to generate three-dimensional form data having characteristic lines desired by a user from original three-dimensional form data, a closed surface consisting of longitudes and meridians is arranged so as to inscribe a three-dimensional form model, and the longitudes and the meridians are projected to a surface of the three-dimensional form to generate parametric curves running along the surface. Then, control points of the parametric curves are moved to adjust the curves so that a part of the parametric curves in correspondence to the movement of the control point moves along the surface of the form model. The curves adjusted are taken as three-dimensional form data of the form model.

25 Claims, 14 Drawing Sheets

METHOD FOR GENERATING THREE-DIMENSIONAL FORM DATA AND APPARATUS THEREFOR

BACKGROUND OF THE INVENTION

1. Field of the Invention

The present invention relates to a method for generating three-dimensional form data having a small amount of data than the original three-dimensional form data and an apparatus therefor.

2. Description of the Prior Art

Active stereo methods are used for measuring a form of an object of various kinds including a human body without contact with the object at a fast speed. A slit projection method, referred to light cutting method generally, is a representative method thereof. In these methods, an object is imaged by illuminating it with a light for detection, and a three-dimensional image (or distance image) is generated by using the principle of trigonometry. The three-dimensional image is a set of pixels in correspondence to three-dimensional positions of points of the object. The slit light projection method uses a slit light having a linear section as light for detection.

A three-dimensional form model of a whole object can be generated by imaging the object from a plurality of positions and by synthesizing three-dimensional images appropriately. The three-dimensional form model or a part thereof of an object can be used for computer graphics, computer-aided design or the like.

When the above-mentioned active stereo method is used, data has a large amount as large as several tens thousands to several hundred thousands points. If the amount of data is so large, there is a serious burden on handling the three-dimensional form data with a computer, or it takes a long time to display a picture or to operate the data. Thus, processing speed becomes low.

Various techniques have been proposed to reduce the amount of data of three-dimensional form model using polygon representation. For example, it is proposed to delete a vertex from the data in the order of shortness of the distance of a vertex from an average polygon of adjacent polygons until the thinning ratio becomes a specified value ("Decimation of Triangle Meshes", Computer Graphics, 26, 2, Jul. 1992)). In this method, the three-dimensional form data are thinned out by increasing polygons having shapes similar to a flat plane, so that the density of points is smaller at portions having simple patterns and is larger at portions having complicated patterns.

A user of computer graphics or the like usually wants to process characteristic lines such as edges of an object. Practically, points along characteristic lines become necessary to reproduce a contour of an object for data processing or animation. However, the prior art methods do not necessarily produce a result that a user intended to generate.

In order to solve this problem, a three-dimensional measuring instrument of point contact type may be used to input points one by one along a line intended by a user. However, this technique takes an elaborate work and a long time because the number of input points is as large as several tens thousands to several hundred thousands.

SUMMARY OF THE INVENTION

An object of the present invention is to provide a method for generating three-dimensional form data, including characteristic lines desired by a user, from original three-dimensional form data.

When three-dimensional form data are thinned out based on a three-dimensional form model, horizontal closed curves and vertical lines intersecting the closed curves are produced so that the closed curves and the lines includes-the three-dimensional form model. Then, the closed curves and the lines are projected to the three-dimensional form model, and a curved surface including a curve group along the three-dimensional form model is generated. Next, the curved surface is modified by moving lines in the curve group projected to the three-dimensional form model, in order to include characteristic lines desired by a user in the form model. For example, movement of control points, deletion of a longitude or a meridian and the like are performed in order to modify the curves and lines. Movement of a longitude or a meridian is included in the movement of control points. The three-dimensional form data after thinning out comprise data for specifying whether it is a longitude or a meridian, data for specifying a segment of a parametric curve, coordinates of end points of each segment and data on continuity, and coordinate data on control points.

An advantage of the present invention is that three-dimensional form data of a smaller amount is generated from the original three-dimensional form data, while including characteristic lines desired by a user.

Another advantage of the present invention is that a curve intended by a user can be generated easily.

A further advantage of the present invention is that a curve after movement can be determined easily at a fast speed of calculation therefor.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
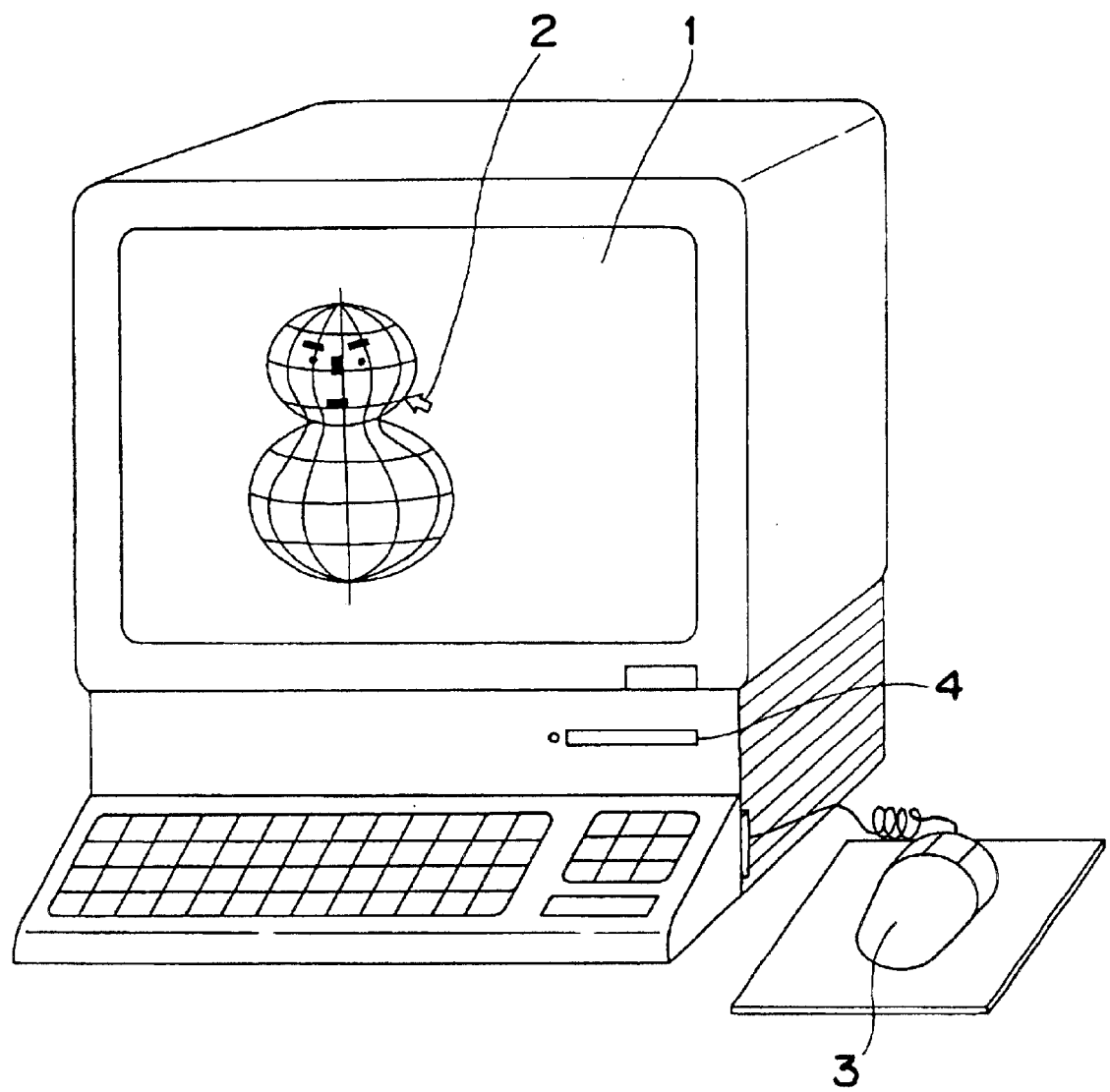
FIG. 1 is a schematic view of a three-dimensional form data processor.

Referring now to the drawings, wherein like reference characters designate like or corresponding parts throughout the views, FIG. 1 shows a three-dimensional form data processor of an embodiment of the invention. The processor 1, such as a work station or a personal computer, comprises a computer having a display screen 2, a flexible disk drive having an opening 4 for inserting a flexible disk, and a mouse 3 as a pointing device for moving a pointer (cursor) 5 on the screen 2.

Figure 2:
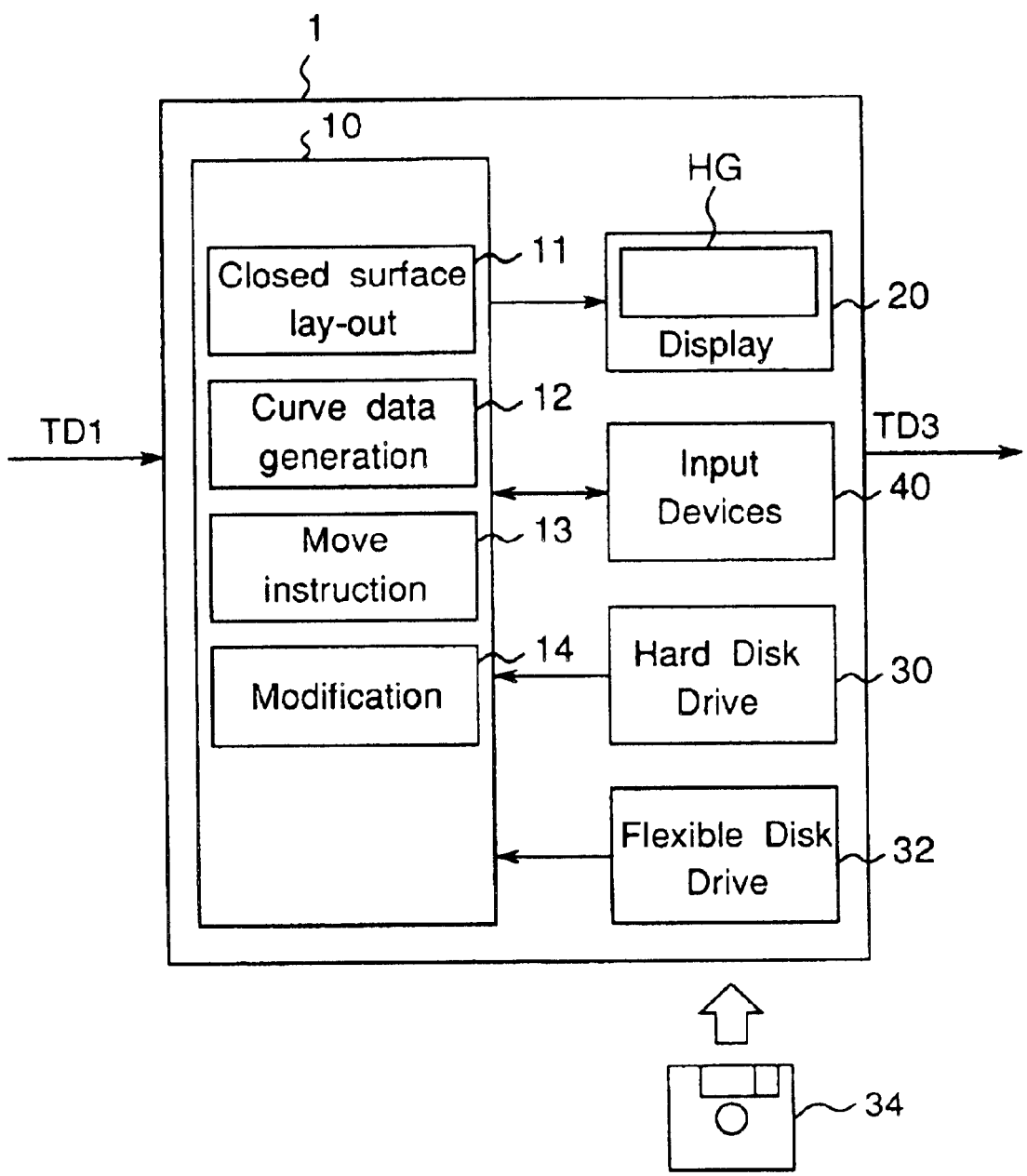
FIG. 2 is a block diagram of the three-dimensional form data processor according to an embodiment of the invention.

FIG. 2 shows a block diagram of the three-dimensional form data processor 1. The three-dimensional form data processor 1 can be fabricated by a so-called work station or a personal computer. The form data processor 1 comprises a processor 10 including a central processing unit for processing data, a display device 20 having the screen 2, a hard disk drive 30 as an auxiliary storage device, a flexible disk drive 32 to which a flexible disk 34 can be inserted, and input devices 40 such as a keyboard and a pointing device such as the mouse 3. The processor 10 comprises a read only memory (not shown) storing a program and data for data processing and a random access memory. The hard disk drive 30 has a hard disk storing an application program for generating a three-dimensional form data or a three-dimensional form model which will be explained below. However, the flexible disk 34 may also store the application program. The processor 10 comprises a closed surface layout section 11, a curve data generation section 12, a move instruction section 13 and a modification section 14, and these sections 11–14 are performed by executing the application program for generating a three-dimensional form data or a three-dimensional form model by using formulas explained below. The three-dimensional form data or a three-dimensional form model is displayed and modified with the display device 20 in the screen 2.

The closed surface layout section 11 arranges a closed surface CCS1 or CCS2 formed virtually with longitudes BCP and meridians BCM for a three-dimensional form model TM1 or TM2 so that the closed surface CCS1, CCS2 includes the three-dimensional form model TM1, TM2 at positions wherein at least a part of an axis AX1 as a center exist inside the three-dimensional form model TM1, TM2.

The curve data generation section 12 generates data on a parametric curve group along the surface of the three-dimensional form model TM1, TM2 by projecting the longitudes BCP and meridians BCM to the axis AX1.

The move instruction section 13 instructs movement of control points of the parametric curve group, or movement, addition or deletion of longitudes or meridians thereof.

The modification section 14 modifies the parametric curves so that portion of the parametric curves relevant to the movement of the control points move along the surface of the three-dimensional model TM1, TM2 when the control points of the parametric curves are moved.

The three-dimensional form data processor 1 receives three-dimensional form data TD1 on an object obtained by a three-dimensional camera with slit light projection method or transmitted from another computer. The three-dimensional form data TD1 has a high density of points of the object, and it consists of a large amount of data. The screen 2 is set so that it is parallel to a plane including coordinate axes Wx and Wy of world coordinate system, and the three-dimensional form TM1 and a closed surface CCS1 to be explained later are set at positions wherein they can be projected to the screen 2. The three-dimensional form data TD1 may be either of a surface model, a solid model or a wire frame model. The three-dimensional model TM1 may be generated by the form data processor 1. The three-dimensional form data processor 1 generates three-dimensional form data TM3 having an amount of data smaller than that of the three-dimensional form data TM1. The as-received three-dimensional form data TD1 may also be output as the form data TM3. The form data TM3 may be stored in a flexible disk or are supplied through a communication line to another computer.

Figure 3:
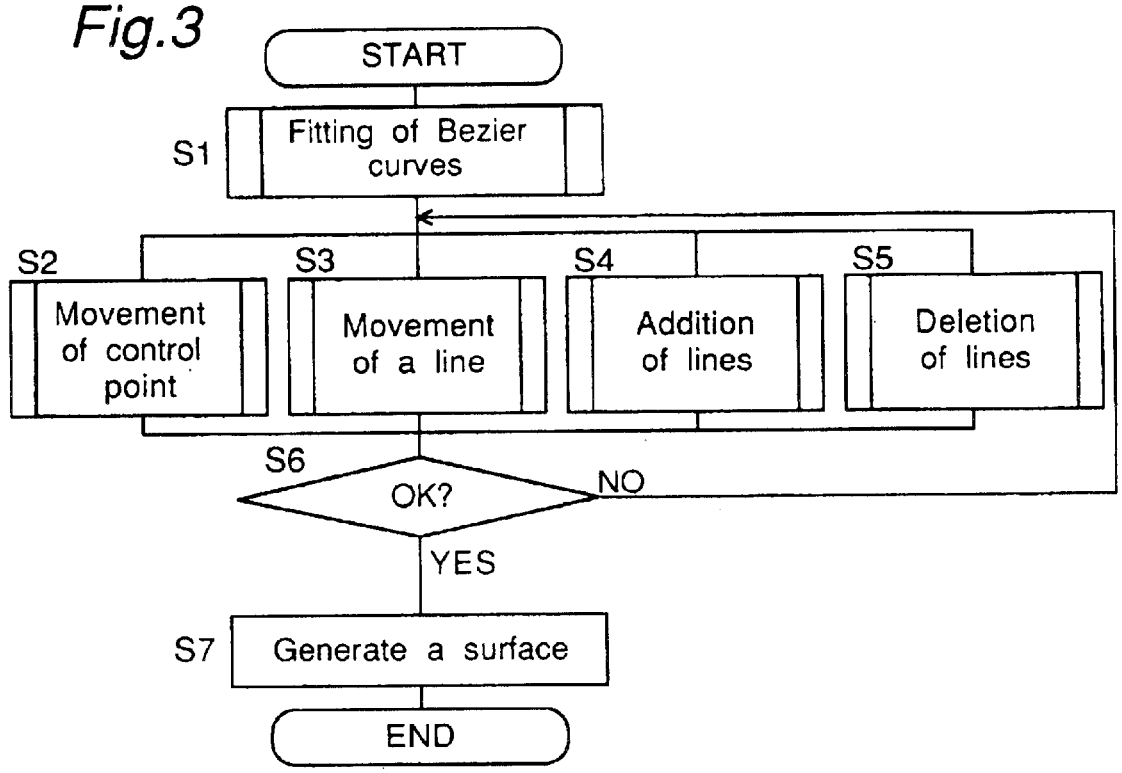
FIG. 3 is a main flowchart of processing of the three-dimensional form data processor.

The operation with the three-dimensional form data processor 1 are explained below. FIG. 3 shows a main flow of the processing of the form data processor 1. First, the three-dimensional form data are fitted to a three-dimensional form model with Bezier curves (step S1). Then, a processing such as movement of control points (step S2), movement in the unit of line (step S3), addition of a line (step S4) or deletion of a line (step S5) is performed when required. The above-mentioned "line" means a meridian BCM or a longitude BCP. When points in correspondence to the three-dimensional form model TM1 are decided (YES at step S6), a surface is generated (step S7).

Next, each processing in the main chart is explained in detail. In this embodiment, Bezier curves of third order are used as spline curves. However, instead of Bezier curves of third order, Bezier curves of a higher order, spline curves other than Bezier curves, or parametric curves other than the spline curves may also be used. Bezier curves are a kind of spline curves, and Bezier curves may be described as spline curves in this description.

Figure 4:
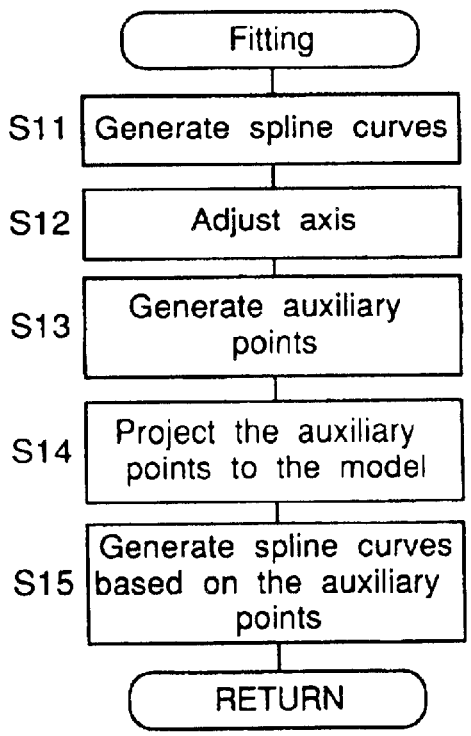
FIG. 4 is a flowchart of fitting of Bezier curves at step S1 in FIG. 3.
Figure 9A:
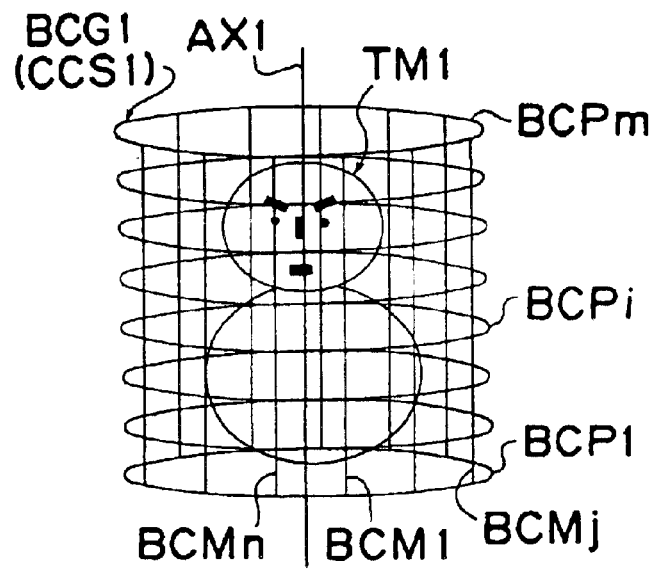
FIGS. 9A, 9B and 9C are diagrams for illustrating steps from generation and adjustment of Bezier curves.
Figure 9B:
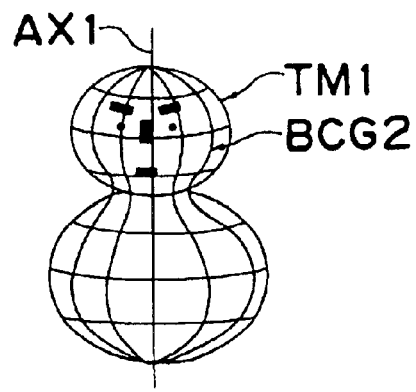
Figure 9C:
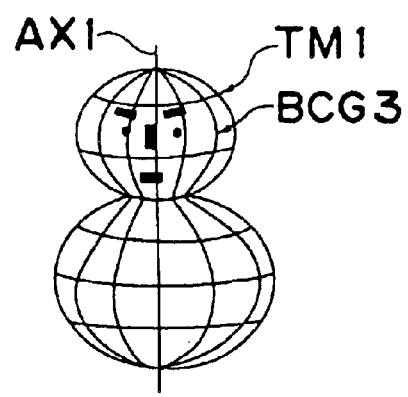
Figure 10:
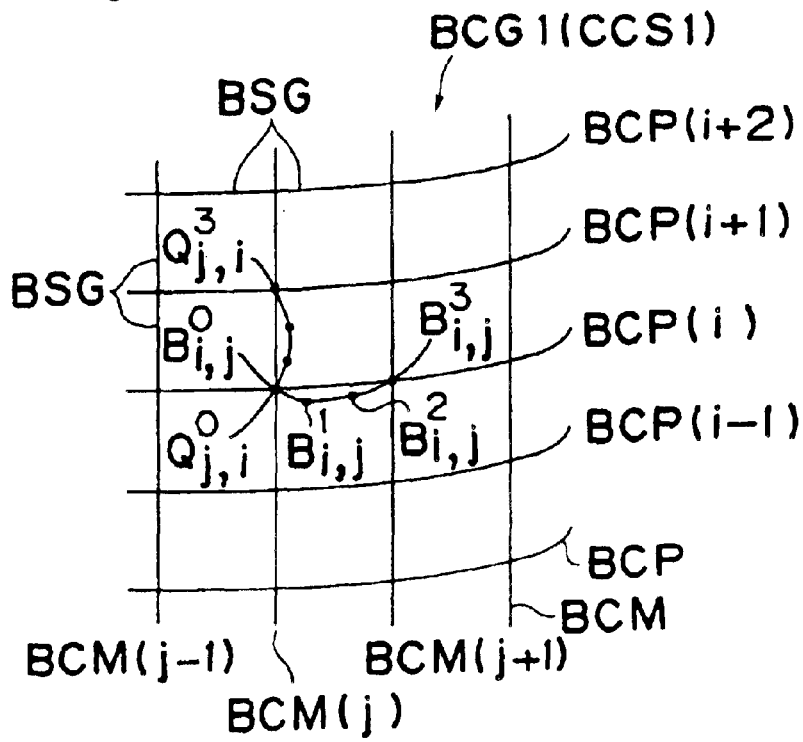
FIG. 10 is a diagram of Bezier curves of a closed surface.
Figure 11:
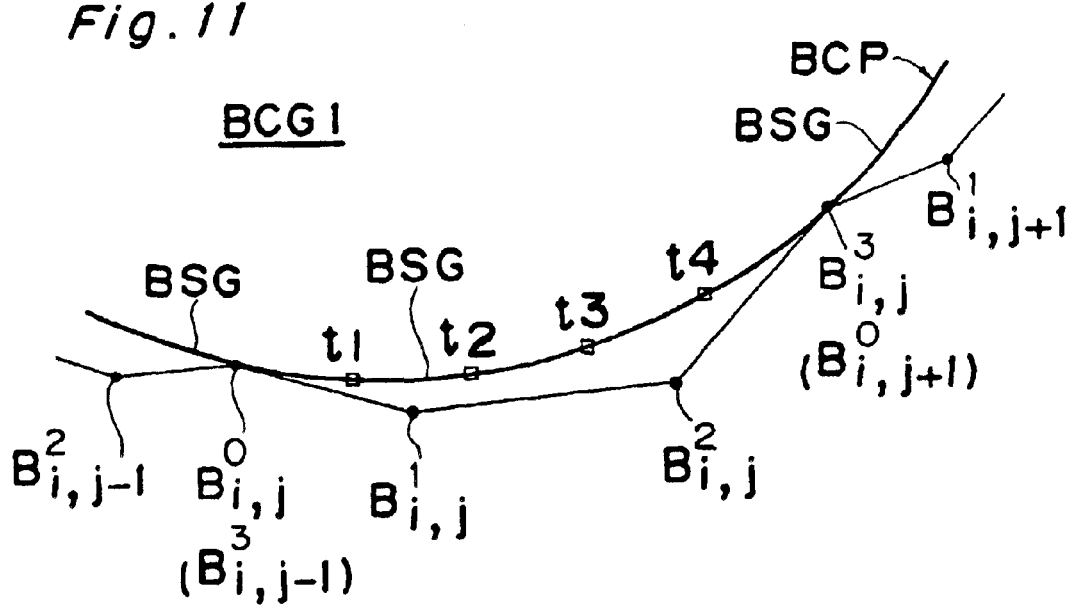
FIG. 11 is a diagram enlarging a part of a longitude.
Figure 12:
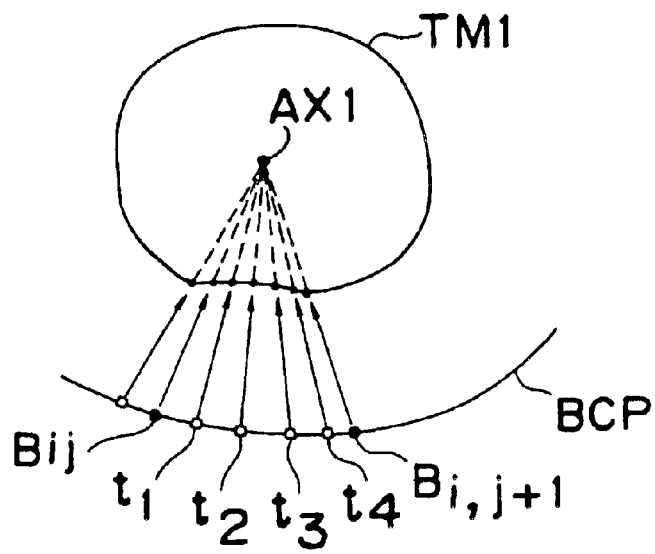
FIG. 12 is a diagram for illustrating projection of auxiliary points to the three-dimensional form model for fitting.

FIG. 4 shows fitting the Beizier curves (step S1 in FIG. 3). First, a Bezier curve group BCG1 consisting of circular longitudes $BCP_1, BCP_2, \ldots, BCP_m$ and linear meridians $BCM_1, BCM_2, \ldots, BCM_n$ is generated for the three-dimensional form model TM1 according to the three-dimensional form data TD1 (step S11). FIGS. 9A, 9B and 9C illustrate steps from generation to modification of Bezier curves, FIG. 10 shows Bezier curves of a closed surface, and FIG. 11 shows an enlarged part of a longitude. As shown in FIGS. 9A and 10, each longitude $BCP_1$-$BCP_m$ has n Bezier segments BSG existing on a plurality of planes aligned at equal distances between them and vertically to an axis AX1 and forming a circle or a polygon so as to include the three-dimensional form model TM1 with the center AX1. Each meridian $BCM_1$-$BCM_n$ consists of (m−1) Bezier segments parallel to the axis AX1 and intersecting with each longitude $BCP_m$. Each BSG is a Bezier curve of third order having four control points including two end points. The Bezier curve group BCG1 consisting of these m*n Bezier curves forms a cylindrical closed surface CCS1 virtually.

Longitudes BCP and meridians BCM as Bezier curves are explained further in detail. The control points for a j-th. Bezier segment BSG of i-th longitude $BCP_i$ are denoted as follows:

$$B_{i,j}{}^0, B_{i,j}{}^1, B_{i,j}{}^2, B_{i,j}{}^3,$$

wherein $$B_{i,j}{}^0 = B_{i,j-1}{}^3.$$

A point P in the Bezier segments are described with the following Eq. (1):

$$P_{i,j}(t) = J_{3,0}(t)B_{i,j}{}^0 + J_{3,1}(t)B_{i,j}{}^1 + J_{3,2}(t)B_{i,j}{}^2 + J_{3,4}(t)B_{i,j}{}^3 \quad (1)$$

wherein $0 \leq t \leq 1$.

On the other hand, the control points for a j-th Bezier segment BSG of i-th meridian $BCM_i$ are represented as follows:

$$Q_{i,j}{}^0, Q_{i,j}{}^1, Q_{i,j}{}^2, Q_{i,j}{}^3,$$

where $$Q_{i,j}{}^0 = Q_{i,j-1}{}^3.$$

Further, $$B_{i,j}{}^0 = Q_{j,1}{}^0.$$

Next, the axis AX1 is adjusted (step S12). In this adjustment, the three-dimensional form model TM1 or the Bezier curve group $BCG_1$ is moved so that the closed surface CCS1 consisting of the Bezier curves includes the three-dimensional form group TM1 and the axis AX1 passes the inside of the three dimensional form model TM1 as near as possible to the center thereof. In order to move the axis AX1, an end point of the axis AX1 is dragged by the pointing device on the screen. Then, the end point moves by an amount in correspondence to the movement of the pointing device on a plane perpendicular to the viewing direction of the screen 2. The axis AX1 may be inclined with respect to the coordinate axes of the world coordinate system.

Next, auxiliary points are generated (step S13) Auxiliary points used for fitting to the form model TM1 are defined as points P obtained by setting $t = t_0, t_1, \ldots, t_k$ ($0 \leq t \leq 1$) in Eq. (1). In the example shown in FIG. 11, four auxiliary points $t_0 - t_4$ are set for each Bezier segment BSG.

Next, the auxiliary points and the end points are projected to the three-dimensional form model TM1 (step S14). Then, new auxiliary points and end points are determined as intersection points Q of vertical lines extending from the original auxiliary points and end points with a surface (polygon) of the three-dimensional form model TM1. If v(d, e, f) is a direction vector projecting a point P(a, b, c) to the three-dimensional form model TM1, $$(x-a)/d = (y-b)/e = (z-c)/f.$$

If an equation of one triangular polygon of the three-dimensional form model is expressed as $$lx + my + nz = 0,$$

the intersection Q(x, y, z) is determined as follows:

$$x = dt + a,$$
$$y = et + b,$$

and $$z = ft + c,$$

wherein $$t = -(lp + mq + nr)/(al + bm + cn + d). \quad (2)$$

Next, it is confirmed if the point Q exists in the particular triangular polygon. If vertices of the triangular polygon are denoted as A, B and C, the point Q exists within the triangular polygon if the following relation holds:

$$\Delta ABC = \Delta QAB + \Delta QBC + \alpha QCA.$$

On the other hand, the point Q does not exist within the triangular polygon if the following relation holds:

$$\Delta ABC < \Delta QAB + \Delta QBC + \Delta QCA.$$

Then, it is confirmed whether the point Q exists in the triangular polygon or not, by using the following Eq. (3)

$$\Delta ABC = |\vec{AB} \times \vec{AC}|,$$

and $$\Delta QAB + \Delta QBC + \Delta QCA = |\vec{QA} \times \vec{QB}| + |\vec{QB} \times \vec{QC}| + |\vec{QA} \times \vec{QB}| \quad (3)$$

If the point Q does not exist in the triangular polygon, the above-mentioned process is repeated to a next triangular polygon.

Next, meridians BCM and longitudes BCP, as Bezier curves along the three-dimensional form model TM1 are determined from the auxiliary points $p_{i,j}(t_1), \ldots, p_{i,j}(t_k)$ on the three-dimensional form model TM1 (step S15). Bezier curves on the three-dimensional form model TM1 are denoted as $R_{i,j}(T)$. Then, $$(D) = (C)(B), \quad (4)$$

where $$(C) = \begin{pmatrix} J_{3,0}(t_1) & J_{3,1}(t_1) & J_{3,2}(t_1) & J_{3,3}(t_1) \\ \vdots & \vdots & \vdots & \vdots \\ \vdots & \vdots & \vdots & \vdots \\ J_{3,0}(t_k) & J_{3,1}(t_k) & J_{3,2}(t_k) & J_{3,3}(t_k) \end{pmatrix}, \quad (5)$$

$$(D) = (P_{i,j}(t_0), P_{i,j}(t_1) \ldots P_{i,j}(t_k))^T \quad (6)$$

and $$(C) = \begin{pmatrix} J_{3,0}(t_1) & J_{3,1}(t_1) & J_{3,2}(t_1) & J_{3,3}(t_1) \\ \vdots & \vdots & \vdots & \vdots \\ \vdots & \vdots & \vdots & \vdots \\ J_{3,0}(t_k) & J_{3,1}(t_k) & J_{3,2}(t_k) & J_{3,3}(t_k) \end{pmatrix}. \quad (7)$$

J is a basis function of a Bezier curve, and it is expressed in Eqs. (8) and (9).

$$J_{n,j}(t) = \binom{n}{i} t^i (1-t)^{n-i}, \quad (8)$$

where $$\binom{n}{i} = \frac{n!}{i!(n-i)!}. \quad (9)$$

(B) is determined by a following relation:

$$(B) = ((C)^T(C))^{-1}(C)_T(D) \quad (10)$$

Then, the following Eq. (11) holds:

$$P_{i,j}(t) = J_{3,0}(t)B_0 + J_{3,1}(t)B_1 + J_{3,2}(t)B_2 + J_{3,4}(t)B_4,$$

wherein $$0 \leq t \leq 1. \tag{11}$$

By processing $q_i$ similarly, the Bezier curves are fitted to the three-dimensional form model TM1 as if the form model TM as an object is covered with a net.

If C1 continuity is needed at connection parts of adjacent Bezier curves $P_{i,j}$ and $P_{i,j+1}$, a constraint condition $$B_{i,j}^3 - B_{i,j}^2 = B_{i,j+1}^1 - B_{i,j+1}^0,$$

is added to the above-mentioned relations. Because $$B_{i,j}^3 = B_{i,j+1}^0,$$

the constraint condition is rewritten as follows:

$$B_{i,j+1}^1 = 2B_{i,j}^3 - B_{i,j}^2. \tag{12}$$

By operating the above-mentioned relations on all the $(2m-1)*n$ Bezier segments BSG, as shown in FIG. 9B, a Bezier curve group BCG2 is obtained by fitting the data to the surface of the three-dimensional form model TM1.

Thus, the three-dimensional form model TM1 is expressed by the Bezier curve group BCG2, and data showing the second Bezier curve group BCG2 is used as its three-dimension-al form data TD2. The three-dimensional form data TD2 comprise data for specifying whether it is a longitude or a meridian, data for specifying a segment of a Bezier curve, coordinates of end points of each segment and data on continuity, and coordinate data on control points. The amount of data of the three-dimensional form data TD2 is usually much smaller than that of the three-dimensional form data TD1 though it depends on the number and the order of the longitudes BCP and the meridians BCM.

However, the three-dimensional form data obtained by the fitting often do not extract characteristics of the three-dimensional form model TM1. Then, the Bezier curve group BCG2 are modified to extract characteristics sufficiently. By modifying the Bezier curve group BCG2, a pattern of the three-dimensional form model TM1 can be expressed with Bezier curves of a number as small as possible. The modification includes movement of control points, movement in the unit of line, addition of a line and deletion of a line (refer to the flow shown in FIG. 3). The modification is performed after one of the modes is specified.

The modification is explained below in detail. First, the movement of control points (step S2 in FIG. 3) is explained with reference to FIG. 5 on a flow of the movement of control points. In this processing, a control point to be selected is specified on the screen 2 with a cursor, and the cursor is moved to a position specified by a user. Then, a portion relevant to the specified control point in the Bezier curve group BCG2 is moved along the surface of the three-dimensional form model TM1.

Figure 5:
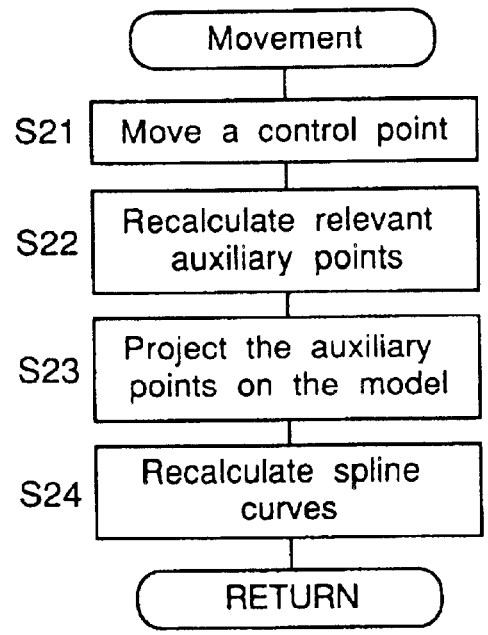
FIG. 5 is a flowchart of movement of control point at step S2 in FIG. 3.
Figure 13:
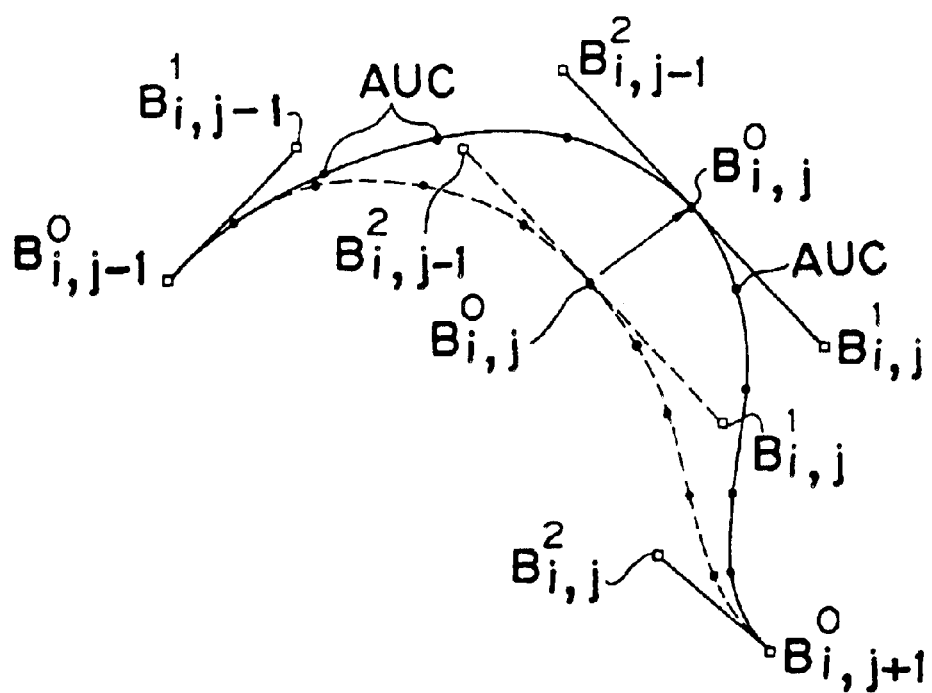
FIG. 13 is a diagram of movement of control points.

In the flow shown in FIG. 5, first, a control point is specified and it is moved (step S21). The control point is moved by dragging the control point with the mouse 3 as a pointing device. A moving length of the control point on the screen 2 is converted to moving length $d(\Delta x, \Delta y, \Delta z)$ in the world coordinate system. Then, the specified control point and two control points adjacent to the specified control point are moved by the same length in the same direction. That is, as shown in FIG. 13, if the specified control point is $$B_{i,j}^0,$$

three control points $$B_{i,j}^0, B_{i,j}^1, \text{ and } B_{i,j-1}^2$$

are moved in parallel.

Next, auxiliary points AUC after the movement existing in a part which is changed by the movement of the control points are recalculated by following Eq. (13) (step S22):

$$P_{ij}^1(t_k) = J_{3,0}(t_k) B_{i,j}^0 + J_{3,1}(t_k) B_{i,j}^1 + J_{3,2}(t_k) B_{i,j}^2 + J_{3,3}(t_k) B_{i,j}^3, \tag{13}$$

wherein k=0, 1, . . . , K.

Figure 14:
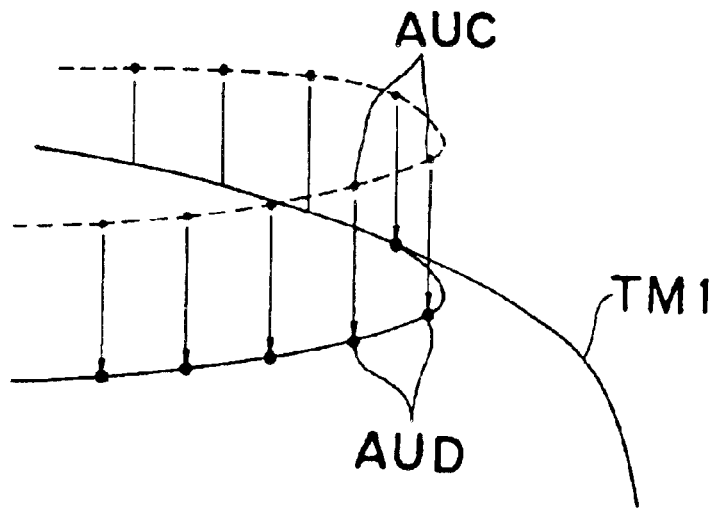
FIG. 14 is a diagram of projection of auxiliary points to the three-dimensional form model.
Figure 15:
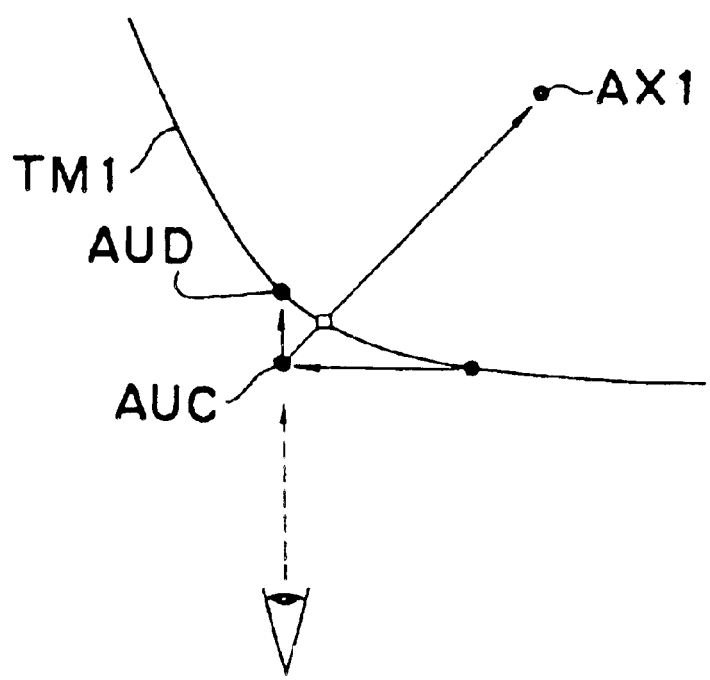
FIG. 15 is a diagram of projection of auxiliary points to the three dimensional form model.

Then, as shown in FIG. 14 illustrating the movement of control points and in FIG. 15 illustrating projection of auxiliary points to the three-dimensional form model, the auxiliary points AUC obtained by the recalculation are projected to the three-dimensional form model TM1 (step S23). The direction of projection is vertical to the screen 2. That is, the viewing direction to the screen is taken as the direction model v at step S14. For example, if v=(0, 0, -1), then v=(-1, 0, 0) for a right side view.

Because the auxiliary points are projected vertically, the positions of the control points are kept the same when viewed by the user. Therefore, the position after the movement can be specified directly on the screen 2. However, they may be projected in the direction of the axis AX1 as in the fitting explained above. In this case, the positions of the control points are changed after the projection according to the uneven surface of the three-dimensional form model, so that the positions after the movement may be shifted from the specified positions, and the user may need to modify the positions after the movement again.

Next, Bezier curves passing through the auxiliary points AUD projected to the three-dimensional model TM1 are recalculated by using Eqs. (4)–(11) (step S24).

When other control points are moved, similar processing are performed.

By moving control points as described above, the Bezier curves are moved on the three-dimensional form model TM1 eventually. Then, by repeating the movement of control points, Bezier curve group BCG2 can be modified without increasing an amount of data, while extracting characteristics of the three-dimensional form model TM1 sufficiently.

Figure 6:
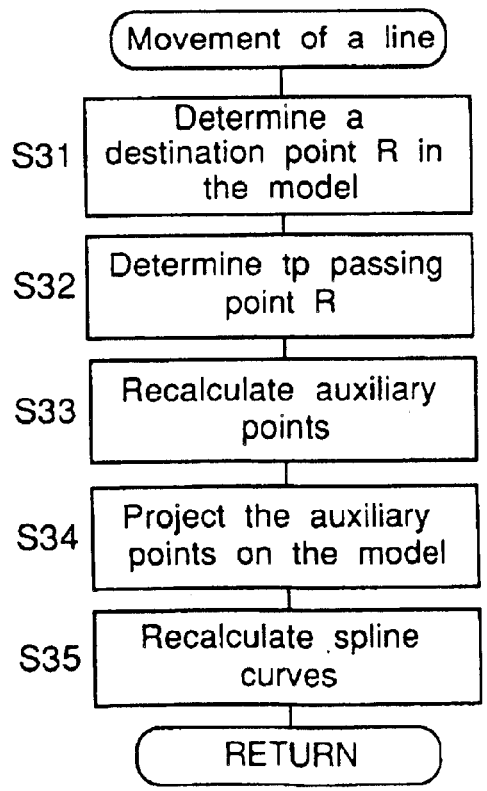
FIG. 6 is a flowchart of movement in the unit of a line at step S3 in FIG. 3.
Figure 16:
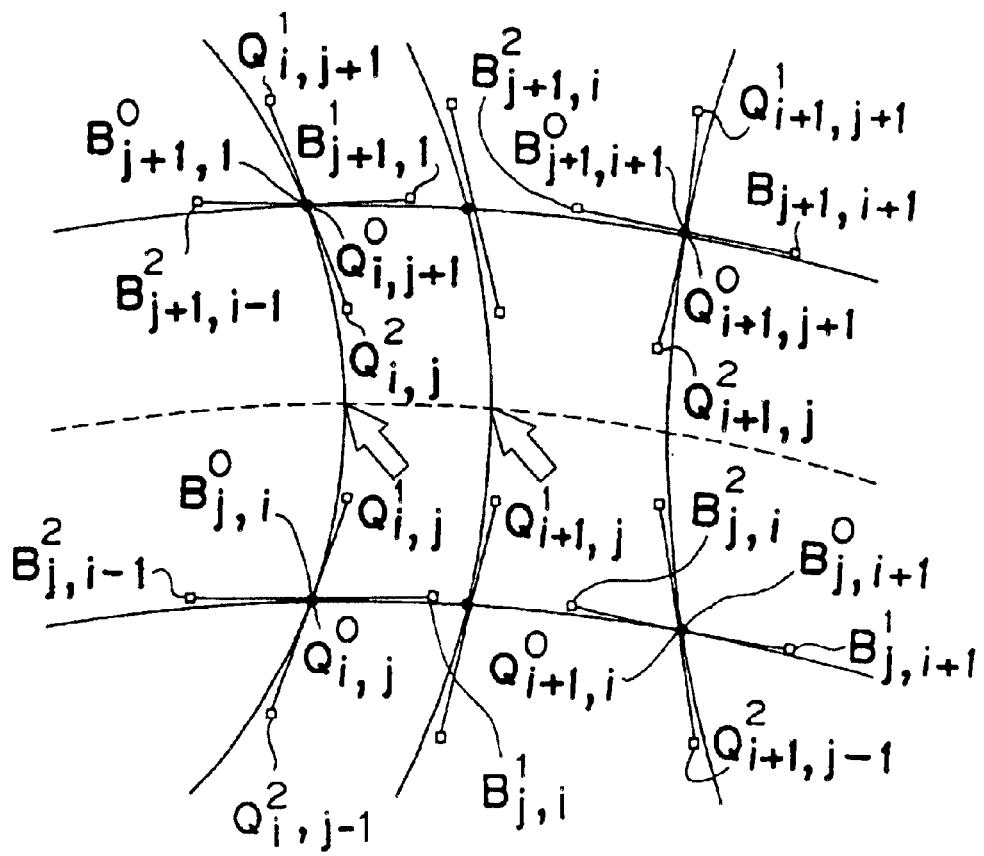
FIG. 16 is a diagram for illustrating movement of meridians.

Next, movement in the unit of line (step S3 in FIG. 3) is explained with reference to FIG. 6. In this processing, other points than the control points on the Bezier curve selected in the screen 2 is specified with a cursor, and the cursor is moved to a desired position. Thus, as shown in FIG. 16 on projection of auxiliary points to the three-dimensional form model, specified Bezier curves in the Bezier curve group BCG2 are moved along the surface of the three-dimensional form model TM1.

First, the user drags a point at a longitude BCP1 or a meridian BCM with the pointing device. Then, a point Ra specified by the pointing device after dragging is projected to the three-dimensional form model TM1 to determine a point R on the model TM1 (step S31).

Next, if a j-th Bezier segment BSG of an i-th meridian BCM is specified at step S31 for moving the i-th meridian, $t_p$ is determined so that the specified Bezier curve passes through the above-mentioned point R by using Eq. (14).

$$Q_{i,j}^{0\ 1} = J_{3,0}(t_p) B_{j,i}^0 + J_{3,1}(t_p) B_{j,i}^1 + J_{3,2}(t_p) B_{j,i}^2 + J_{3,3}(t_p) B_{j,i+1},$$

$$Q_{i,j+1}^{0\ 1} = J_{3,0}(t_p) B_{j+1,i}^0 + J_{3,1}(t_p) B_{j+1,i}^1 + J_{3,2}(t_p) B_{j+1,i}^2 + J_{3,3}(t_p) B_{j+1,i+1}^0,$$

$$Q_{i,j}^{1\ 1} = (1-t_p)(Q_{i,j}^1 - Q_{i,j}^0) + t_p(Q_{i+1,j}^1 - Q_{i+1,j}^0) + Q_{i,j}^{0\ 1},$$

and $$Q_{i,j}^{2\ 1}=(1-t_p)(Q_{i,j}^{2}-Q_{i,j+1}^{0})+t_p(Q_{i+1,j}^{2}-Q_{i+1,j+1}^{0})+Q_{i,j+1}^{0\ 1}. \quad (14)$$

By using the $t_p$, auxiliary points $q_{i,j}$, $P_{i,j}$ of all the Bezier segments BSG of the i-th meridian BCM are calculated for j=0, 1, . . . , M, as follows (step S33):

$$q_{ij}^{1}(t_k)=J_{3,0}(t_k)Q_{i,j}^{0\ 1}+J_{3,1}(t_k)Q_{i,j}^{1\ 1}+J_{3,2}(t_k)Q_{i,j}^{2\ 1}+J_{3,3}(t_k)Q_{i,j+1}^{0} \quad (15)$$

wherein k=0, 1, . . . , K.

$$P_{j,i}^{1}(t_k)=J_{3,0}(L)B_{j,i}^{0}+J_{3,1}(L)B_{j,i}^{1}+J_{3,2}(L)B_{j,i}^{2}+J_{3,3}(L)B_{j,i+1}^{0}, \quad (16)$$

wherein $$L = t_p + \frac{k(1-t_p)}{K}.$$

If a longitude BCP is specified for the movement, auxiliary points q and p are calculated for j=0, 1, . . . , M as follows:

$$p_{j,i-1}^{1}(t_k)=J_{3,0}(U)B_{j,i-1}^{0}+J_{3,1}(U)B_{j,i-1}^{1}+J_{3,2}(U)B_{j,i-1}^{2}+J_{3,3}(U)B_{j,i-1}^{0},$$

where

0≦U≦1, and $$P_{j,i-1}^{1}(t_k)=J_{3,0}(U-1)B_{j,i}^{0}+J_{3,1}(U-1)B_{j,i}^{1}+J_{3,2}(U-1)B_{j,i}^{2}+J_{3,3}(U-1)B_{j,i+1}^{0} \quad (17)$$

where

U>1.

$$U = \frac{k(1+t_p)}{K}$$

where k=0, 1, . . . , K.

Then, the auxiliary points are projected to the three-dimensional form model TM1 (step S34), and Bezier curves are recalculated (step S35).

Figure 7:
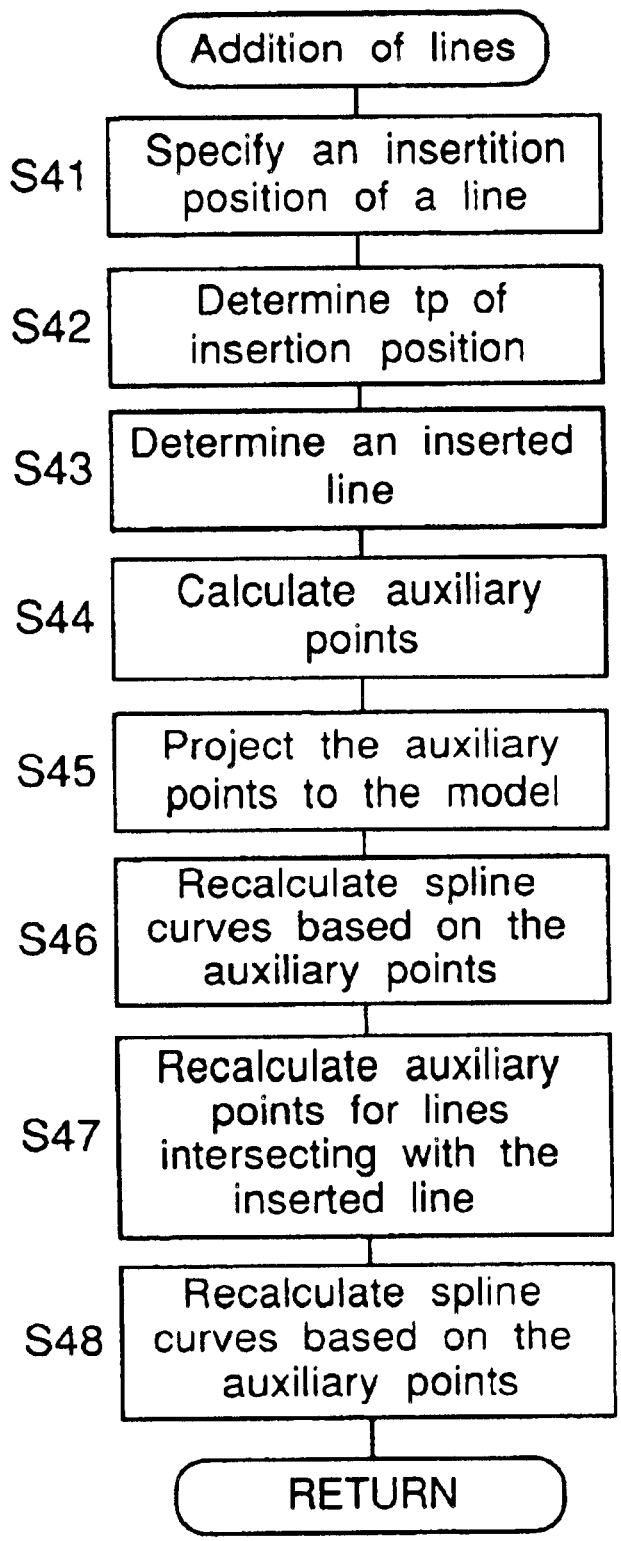
FIG. 7 is a flowchart of addition of a line at step S4 in FIG. 3.

Next, the addition of a line (step S4 in FIG. 3) is explained with reference to a flow shown in FIG. 7. First, a point on a line intersecting with the line a user wants to add is clicked by the pointing device. For example, when a meridian BCM is wanted to be added, a position on a longitude BCP is clicked, or when a longitude BCP is wanted to be added, a position on the meridian BCM is clicked. Thus, a point R on the line $q_{i,j}$ clicked is specified (step S41). Then, $t_p$ satisfying the following relation is determined (step S42):

$$R=J_{3,0}(t_p)Q_{i,j}^{0}+J_{3,1}(t_p)Q_{i,j}^{1}+J_{3,2}(t_p)Q_{i,j}^{2}+J_{3,3}(t_p)Q_{i,j+}^{0}.$$

Then, control points are calculated by using $t_p$ as follows (step S43):

$$B_{j,i}^{0\ 1}=J_{3,0}(t_p)Q_{i,j}^{0}+J_{3,1}(t_p)Q_{i,j}^{1}+J_{3,2}(t_p)Q_{i,j}^{2}+J_{3,3}(t_p)Q_{i,j+1}^{0},$$

$$B_{j,i+1}^{0\ 1}=J_{3,0}(t_p)Q_{i+1,j}^{0}+J_{3,1})t_p)Q_{i+1,j}^{1}+J_{3,2}(t_p)Q_{i+1,j}^{2}+J_{3,3}(t_p)Q_{i+1,j+1}^{0},$$

$$B_{j,i}^{1\ 1}=(1-t_p)(B_{j,i}^{1}-B_{j,i}^{0})+t_p(B_{j+1,i}^{1}-B_{j+1,i}^{0})+B_{j,i}^{0},$$

and $$B_{j,i+1}^{0}=J_{3,0}(t_p)Q_{i+1,j}^{0}+J_{3,1}(t_p)Q_{i+1,j}^{1}+J_{3,2}(t_p)Q_{i+1,j}^{2}+J_{3,3}(t_p)Q_{i+1,j+1}^{0} \quad (18)$$

Next, auxiliary points $P_{j,i}(t_k)$ are calculated by using the obtained control points (step S44):

$$P_{j,i}(t_k)=J_{3,0}(t_k)B_{j,i}^{0\ 1}+J_{3,1}(t_k)B_{j,i}^{1\ 1}+J_{3,0}(t_k)B_{j,i}^{2\ 1}+J_{3,0}(t_k)B_{j,i+1}^{0\ 1} \quad (19)$$

wherein k=1, 2, . . . , K.

K auxiliary points per Bezier segment BSG are calculated for all k.

Next, the calculated auxiliary points are projected to the three-dimensional form model TM1 (step S45). Then, Bezier curves are calculated for the projected auxiliary points, similarly to at step S15 (step S46).

Next, auxiliary points q of lines intersecting the inserted line are calculated as shown below (step S47). For example, when a longitude BCP is inserted, auxiliary points of meridians BCM intersecting the longitude are calculated.

$$q_{i,j}(L)=J_{3,0}(L)Q_{i,j}^{0}+J_{3,1}(L)Q_{i,j}^{1}+J_{3,2}(L)Q_{i,j}^{2}+J_{3,3}(L)Q_{i,j+1}^{0}, \quad (20)$$

and $$L = k + \frac{t_p}{K}$$

where k=0, 1, . . . , K−1, and $$q_{i,j}^{1}(U)=J_{3,0}(U)Q_{i,j}^{0}+J_{3,1}(U)Q_{i,j}^{1}+J_{3,2}(U)Q_{i,j}^{2}+J_{3,3}(U)Q_{i,j+1}^{0}, \quad (21)$$

and $$U = \frac{k(1-t_p)}{K} + t_p$$

where k=0, 1, . . . ,K−1.

Next, Bezier curves are calculated by using the calculated auxiliary points q, similarly at step S15 (step S48). Thus, the line is inserted.

Figure 8:
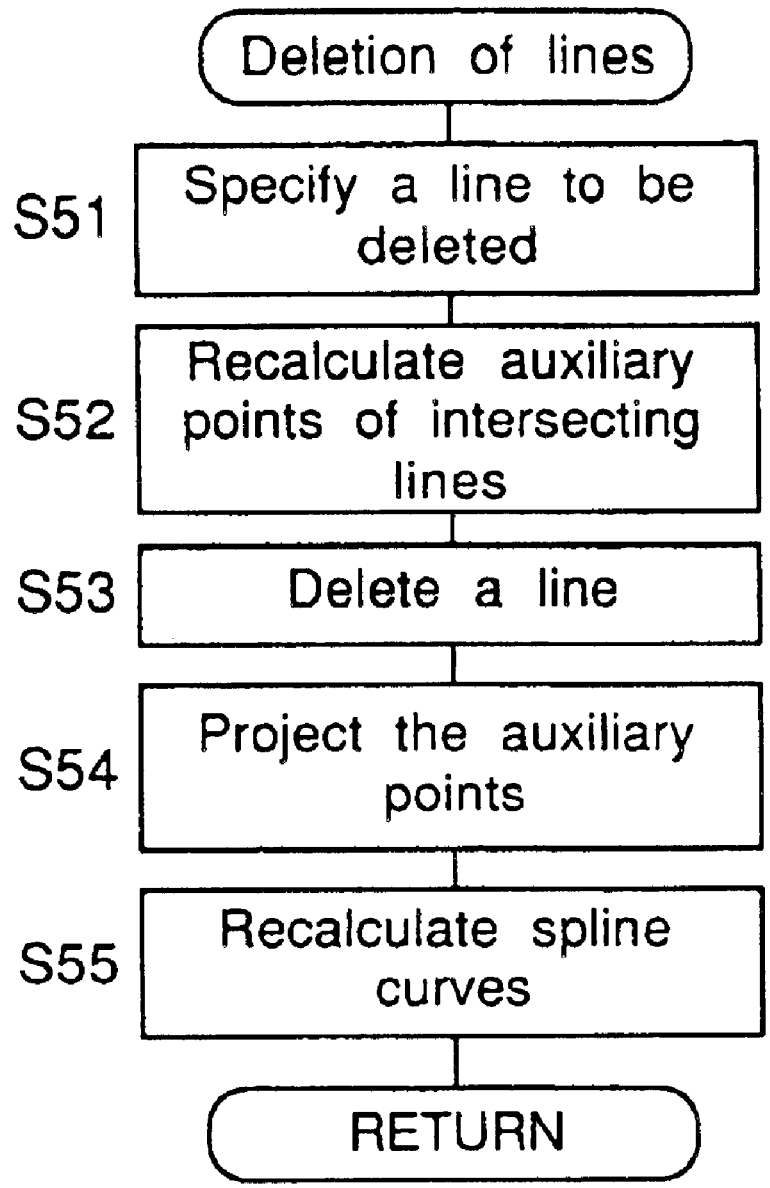
FIG. 8 is a flowchart of deletion of a line at step S5 in FIG. 3.

Next, the deletion of a line (step S5 in FIG. 3) is explained with reference to FIG. 8. First, a point on a line which a user wants to delete is clicked on the screen 2 with the pointing device (step S51). For example, when a user wants to delete an i-th meridian BCM, the meridian BCM is specified by the pointing device.

Then, auxiliary points p of lines intersecting the specified line are calculated (step S52). That is, the auxiliary points of Bezier segments BSG of $p_{j,i}$ and $P_{j,i-1}$ connecting to the Bezier curve to be deleted are calculated.

$$p_{i,j}(L)=J_{3,0}(L)B_{i,j}^{0}+J_{3,1}(L)B^{i,j1}+J_{3,2}(L)B_{i,j}^{2}+J_{3,3}(L)B_{i,j+1}^{0},$$

wherein

0<L<1, and $$p_{i,j}(L)=J_{3,0}(L)B_{i,j-}^{0}+J_{3,1}(L)B_{i,j-1}^{1}+J_{3,2}(L)B_{i,j-1}^{2}+J_{3,3}(L)B_{i,j}^{0}, \quad (22)$$

wherein

1≦L≦2, wherein $$L = \frac{2k}{K},$$

and k=1, 2, ..., K−1.

Then, an i-th meridian BCM is deleted (step S53), and the auxiliary points calculated at step S52 are projected to the three-dimensional model TM1 (step S54). Finally, Bezier curves are recalculates similarly at step S15 (step S55).

Thus, a modified Bezier curve group BCG3 is obtained as shown in FIG. 9C. Data on the modified Bezier curves BCG3 are output as three-dimensional form data TD3 of the three-dimensional form model TM1. A surface data determined as explained below may be added to the three-dimensional form data TD3.

Next, the processing is explained for determining a surface by using the modified Bezier curve group BCG3 (step S7 in FIG. 3). It is assumed here that a surface spans a portion defined by i-th and (i+1)-th meridians BCM and j-th and (j+1)-th longitudes BCP. If the surface is divided to K*P polygons, the vertices of the polygons are (K+1)*(P+1) points obtained by the following relation:

$$q_{i,j}(t_k, t_p) = J_{3,0}(t_p)Q_{j,i}^{0\;1} + J_{3,1}(t_p)Q_{j,i}^{1\;1} + J_{3,2}(t_p)Q_{j,i}^{2\;1} + J_{3,3}(t_p)Q_{j,i+1}^{0\;1}, \quad (23)$$

wherein $$Q_{i,j}^{0} = J_{3,0}(t_k)B_{j,i}^{0} + J_{3,1}(t_k)B_{j,i}^{1} + J_{3,2}(t_k)B_{j,i}^{2} + J_{3,3}(t_k)B_{j,i+1 0},$$

$$Q_{i,j}^{1\;1} = (1-t_k)(Q_{i,j}^{1} - Q_{i,j}^{0}) + t_k(Q_{i+1,j}^{1} - Q_{i+1,j}^{0}),$$

$$Q_{i,j}^{2\;1} = (1-t_k)(Q_{i,j2} - Q_{i,j+1}^{0}) + t_k(Q_{i+1,j}^{2}Q_{i+1,i+1,i+1}),$$

and $$Q_{i,j+1}^{0\;1} = J_{3,0}(t_k)B_{j+1,i}^{0} + J_{3,1}(t_k)B_{j+1,i}^{1} + J_{3,2}(t_k)B_{j+1,i}^{2} + J_{3,3})(t_k)B_{j+1,i+1}^{0}. \quad (24)$$

The surface consists of K*P quadrilateral polygons of $q_{i,j}$ (k,p), $q_{i,j}$(k+1,p), $q_{i,j}$(k+1,p+1) and $q^{i,j}$ (k,p+1) where k=0, 1, ..., K and p=0, 1, ..., P. A polygon model can be obtained by performing the above operation on all i's and j's.

Figure 17:
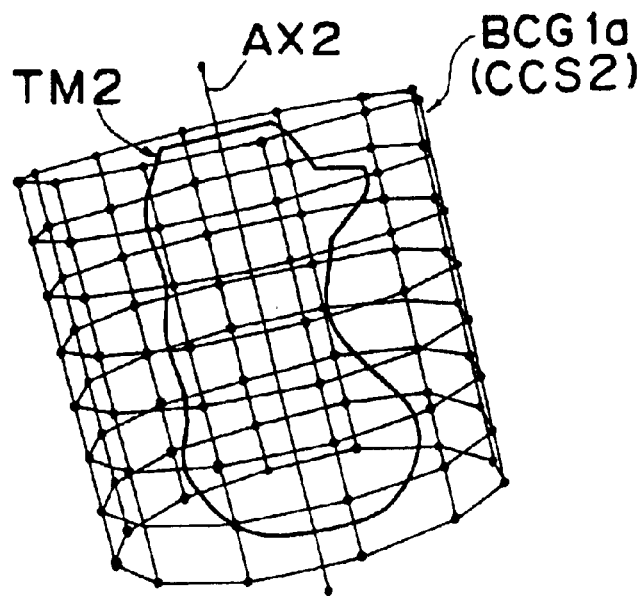
FIG. 17 is a diagram of another three-dimensional form model and a closed surface.
Figure 18:
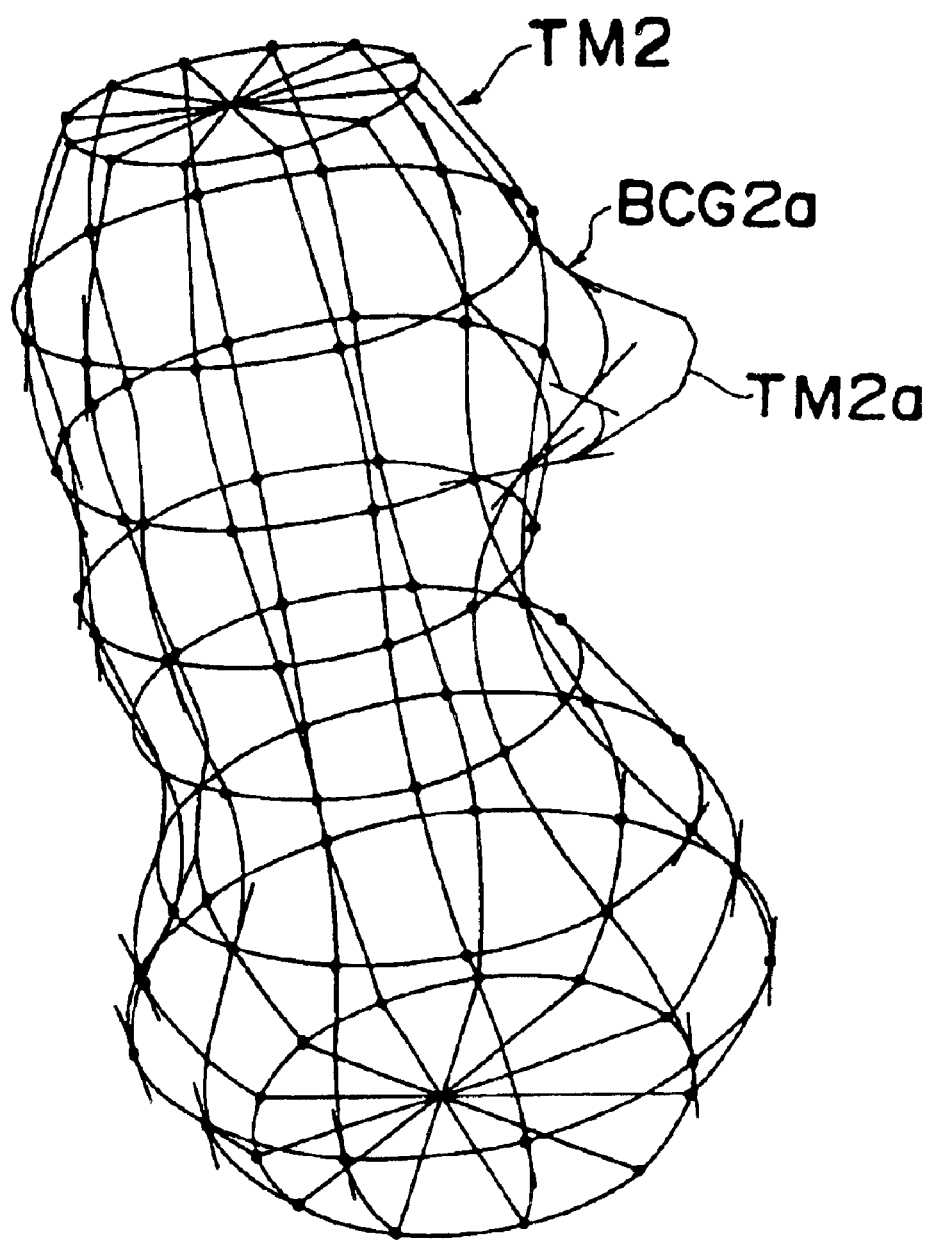
FIG. 18 is a diagram after fitting to the form model.
Figure 19:
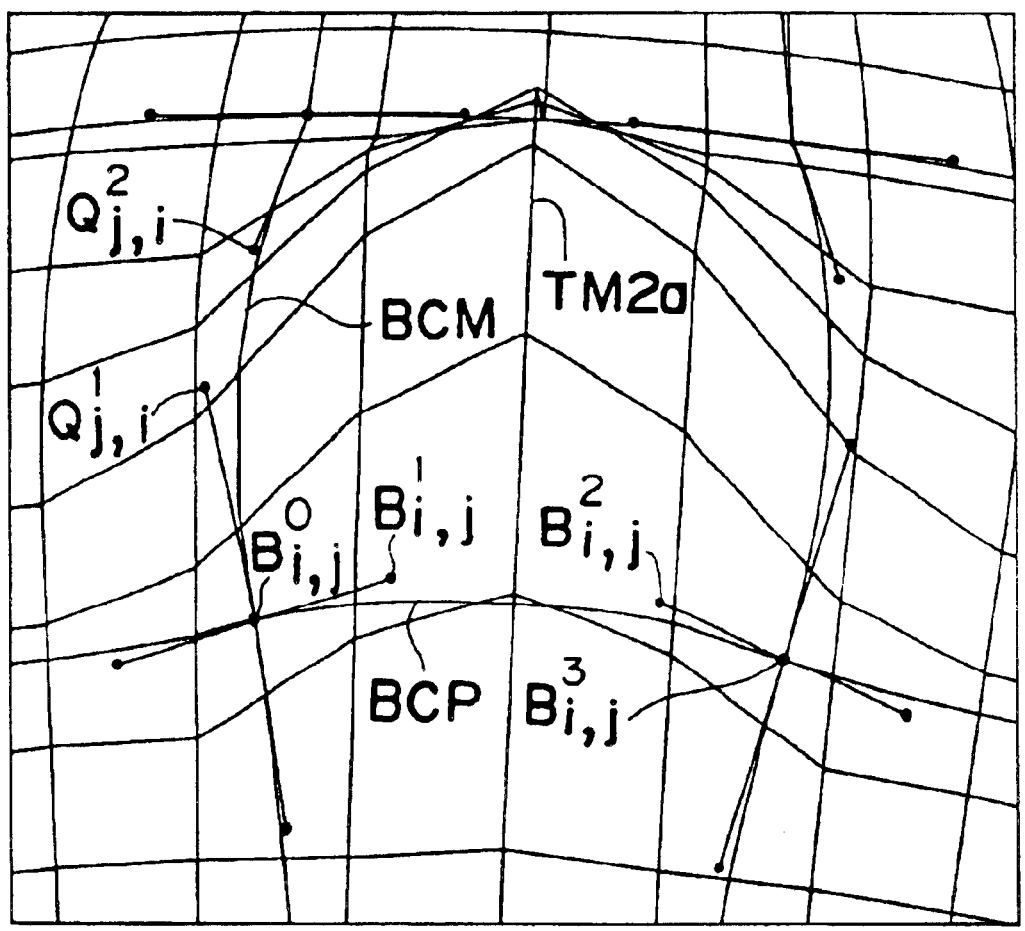
FIG. 19 is a diagram enlarging a part of the diagram shown in FIG. 17.

Next, another example is explained with reference to FIGS. 17–20 for a different three-dimensional form model TM2. FIG. 17 shows a closed surface CCS2 consisting of Bezier curves BCG1a to include the three-dimensional form model TM2. FIG. 1B illustrates a state after fitted to the form model TM2, FIG. 19 shows an enlarged part of the diagram shown in FIG. 17, and FIG. 20 illustrates a state after moving control points for the Bezier curve group BCG2a shown in FIG. 19.

In FIG. 17, because the three-dimensional form model TM2 are arranged to be inclined a little in the world coordinate system, an axis AX2 of a closed curve CCS2 is inclined in correspondence to the form model TM2. FIG. 18 shows the Bezier curve group BCG2a fitted to the three-dimensional form group TM2. However, as shown in FIG. 19, for example, the Bezier curve group BCG2a does not pass a protrusion part TM2a of the form model TM2. Therefore, the pattern of the protrusion part TM2a is lost in this state.

Figure 20:
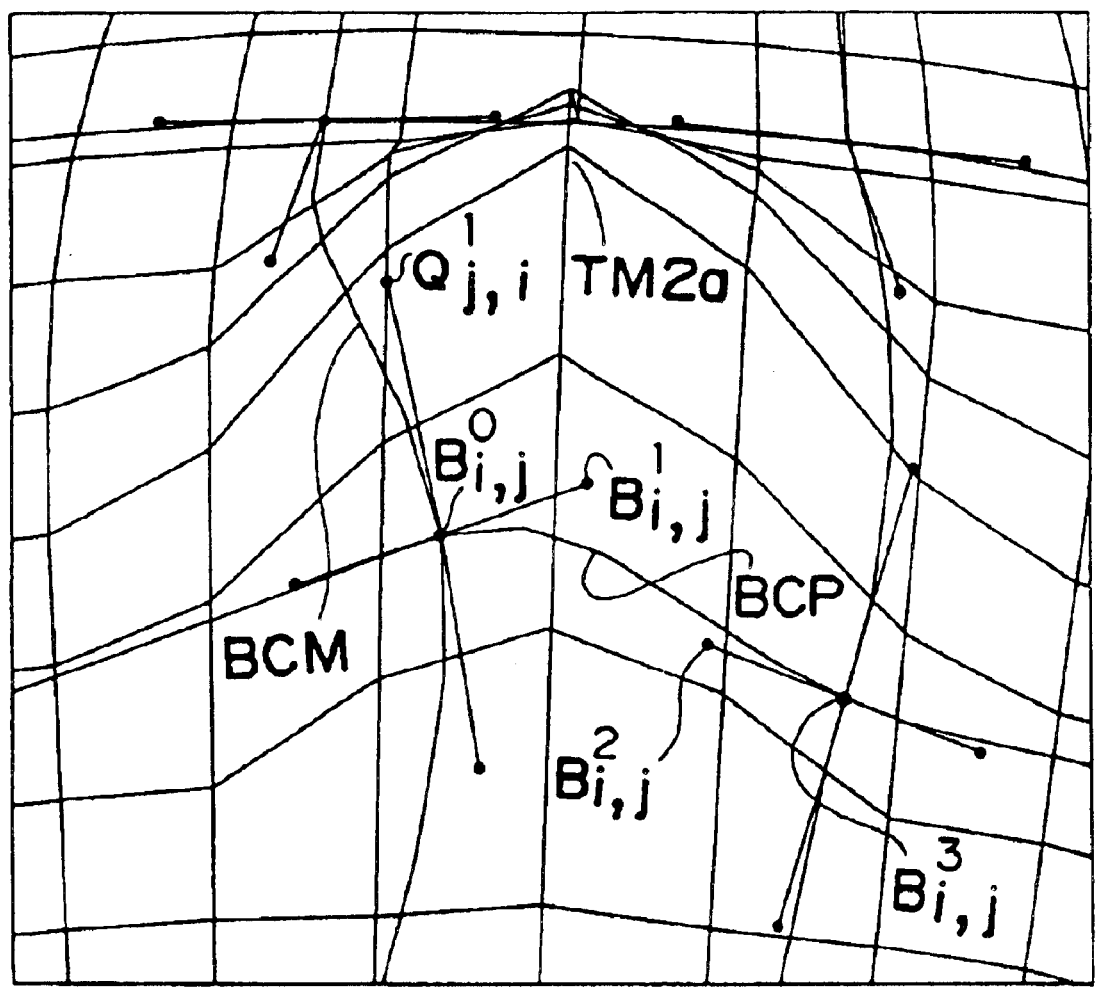
FIG. 20 is a diagram for illustrating a state after moving control points.

Then, as shown in FIG. 20, control points are moved in order to modify Bezier curves to pass the neighborhood of the protrusion part TM2a. A meridian BCM or a longitude BCP passing the protrusion part TM2a may be added. Thus, the Bezier curve group is modified so that meridians BCM and longitudes BCP passe the protrusion part or edges of the model TM2 or the density thereof is increased.

As explained above, in the three-dimensional form data processor 1, a user moves, adds or deletes spline curves by operating the input device 40 while spline curves are restrained to contact the surface of the three-dimensional form model TM1, TM2. Thus, the user produces the three-dimensional form data TD3 which he or she intends to generate, while keeping characteristic lines of the three-dimensional form model TM1, TM2. Because data on points on characteristic lines are available, they may be easily modified at later steps. The number of points in the three-dimensional form data TD3 is much smaller than that in the original three-dimensional form data TD1, and an amount of the data of the former is much smaller than that of the latter. Therefore, the processing can be operated fast when a three-dimensional form model is displayed based on the three-dimensional form data TD3 or it is moved or rotated. Further, the operation is fast because no curved surfaces are used in the modification of the spline curve group.

In the above-mentioned embodiment, the cylindrical closed surface CCS1 is formed with the Bezier curves BCG1. However, the closed surface may have a different shape such as a cone or a truncated cone. Further, it may be spherical. In this case, projection is performed not to the axis AXE, but to the center of the sphere.

Although the present invention has been fully described in connection with the preferred embodiments thereof with reference to the accompanying drawings, it is to be noted that various changes and modifications on the structure or a part thereof, the processings, the order or the processings or operation thereof are apparent to those skilled in the art. Such changes and modifications are to be understood as included within the scope of the present invention as defined by the appended claims unless they depart therefrom.

What is claimed is:

1. A computer-readable medium having stored thereon a plurality of sequences of instructions which, when executed by a processor, cause said processor to generate three-dimensional form data by performing the steps of:

preparing a three-dimensional form data representing a three-dimensional form model;

projecting two-dimensional horizontal closed curves encircling the three-dimensional form model with leaving a space to the three-dimensional form model and vertical lines intersecting the closed curves to the three-dimensional form model to generate a group of curves along a surface of the three-dimensional form model; and modifying the group of curves by moving a curve or curves in the group along a surface of the three-dimensional form model.

2. The computer-readable medium according to claim 1, wherein said computer-readable medium comprises a magnetic medium.

3. The computer-readable medium according to claim 1, wherein said computer-readable medium comprises a flexible disk.

4. The computer-readable medium according to claim 1, wherein said computer-readable medium comprises a hard disk.

5. A computer-readable medium having stored thereon a plurality of sequences of instructions which, when executed by a processor, cause said processor to generate three-dimensional form data by performing the steps of:

preparing a three-dimensional form data representing a three-dimensional form model;

projecting two-dimensional horizontal closed curves encircling the three-dimensional form model with leaving a space to the three-dimensional form model and vertical lines intersecting the closed curves to the three-dimensional form model to generate a group of curves along a surface of the three-dimensional form model; and modifying the group of curves by adding a curve or curves projected to the three-dimensional form model to the group of curves.

6. The computer-readable medium according to claim 5, wherein said computer-readable medium comprises a magnetic medium.

7. The computer-readable medium according to claim 5, wherein said computer-readable medium comprises a flexible disk.

8. The computer-readable medium according to claim 5, wherein said computer-readable medium comprises a hard disk.

9. A computer-readable medium having stored thereon a plurality of sequences of instructions which, when executed by a processor, cause said processor to generate three-dimensional form data by performing the steps of:

preparing a three-dimensional form data representing a three-dimensional form model;

projecting two-dimensional horizontal closed curves encircling the three-dimensional form model with leaving a space to the three-dimensional form model and vertical lines intersecting the closed curves to the three-dimensional form model to generate a group of curves along a surface of the three-dimensional form model; and modifying the group of curves by deleting a curve or curves in the group of curves.

10. The computer-readable medium according to claim 9, wherein said computer readable medium comprises a magnetic medium.

11. The computer-readable medium according to claim 9, wherein said computer-readable medium comprises a flexible disk.

12. The computer-readable medium according to claim 9, wherein said computer-readable medium comprises a hard disk.

13. A computer system comprising:

a processor, and a memory coupled to said processor, the memory having stored therein sequence of instructions which, when executed by said processor, cause said processor to generate three-dimensional form data by causing the processor to perform the steps of:

projecting two-dimensional horizontal closed curves encircling the three-dimensional form model with leaving a space to the three-dimensional form model and vertical lines intersecting the closed curves to the three-dimensional form model to generate a group of curves along a surface of the three-dimensional form model; and modifying the group of curves by adding a curve or curves projected to the three-dimensional form model to the group of curves.

14. A computer system comprising:

a processor; and a memory coupled to said processor, the memory having stored therein a sequence of instructions which, when executed by said processor, cause said processor to generate three-dimensional form data by causing the processor to perform the steps of:

projecting two-dimensional horizontal closed curves encircling the three-dimensional form model with leaving a space to the three-dimensional form model and vertical lines intersecting the closed curves to the three-dimensional form model to generate a group of curves along a surface of the three-dimensional form model; and modifying the group of curves by deleting a curve or curves in the group of curves.

15. A computer-implemented method of generating three-dimensional form data to be used in a computer apparatus, the method comprising the steps of:

obtaining an electronic data of a three-dimensional form model;

generating a plurality of lines along a surface of the three-dimensional form model by projecting horizontal lines encircling the three-dimensional form model with leaving a space to the three-dimensional form model and vertical lines intersecting the horizontal lines to the three-dimensional form model, the plurality of generated lines corresponding exactly to contours of the three-dimensional form model; and modifying the plurality of generated lines in response to a user instruction, wherein the user instruction includes at least one of an addition of at least one line in the plurality of lines, a movement of at least one of the lines, and a deletion of at least one of the lines, after the modification, the plurality of lines still correspond exactly to contours of the three-dimensional form model, and both before and after the modification, any one of the plurality of lines do not cross with any one of the remaining ones of the plurality of lines.

16. The method according to claim 15, wherein said plurality of lines along the surface of the three-dimensional form model corresponding exactly to contours of the three-dimensional form model comprises a parametric curve group.

17. The method according to claim 16, wherein in said modifying step, by moving control points of the parametric curve group, a part of the parametric curve group in correspondence to the movement of the control points is moved along the surface of the three-dimensional form model.

18. The method according to claim 15 wherein the generated plurality of lines comprises a spline curve group.

19. The method according to claim 15, further comprising the step of:

generating a summary data for representing the modified plurality of generated lines, wherein a quantity of the summary data is smaller than a quantity of the obtained three-dimensional form data.

20. The method according to claim 15, wherein the electronic data representing a three-dimensional form model is provided from a generator which generates the electronic data.

21. A computer system comprising:

a processor, and a memory coupled to said processor, the memory having stored therein a sequence of instructions which, when executed by said processor, cause said processor to generate three-dimensional form data by causing the processor to perform the steps of:

projecting two-dimensional horizontal closed curves encircling the three-dimensional form model with leaving a space to the three-dimensional form model and vertical lines intersecting the closed curves to the three-dimensional form model to generate a group of curves along a surface of the three-dimensional form model; and modifying the group of curves by moving a curve or curves in the group along a surface of the three-dimensional form model.

22. A computer-implemented method of processing an electronic data representing a three-dimensional model, the method comprising the steps of:

receiving a first electronic data of a three-dimensional model of an object which has been acquired on the object;

generating a second electronic data that represents a first set of uncrossed lines corresponding exactly to first portions on a surface of the three-dimensional model, said second electronic data being generated by projecting horizontal lines encircling the three-dimensional model with leaving a space to the three-dimensional model and vertical lines intersecting the horizontal lines to the three-dimensional model, wherein a capacity of the second electronic data is smaller than that of the first electronic data; and generating, from the second electric data, a third electronic data that represents a second set of uncrossed lines corresponding exactly to second portions on the surface of the three-dimensional model, the second portions including at least one portion different from any one of the first portions, wherein a capacity of the third electronic data is smaller than that of the first electronic data.

23. The computer-implemented method according to claim 22, wherein in the step of generating the second or third electronic data, the second or third electronic data is extracted from the first electronic data, around portions at which predetermined lines are projected onto the three-dimensional model.

24. The computer-implemented method according to claim 23, wherein positions of the first or second portions are changed by changing the predetermined lines to be projected onto the three-dimensional model.

25. A computer-implemented method of generating three-dimensional form data to be used in a computer apparatus, the method comprising the steps of:

obtaining an electronic data of a three-dimensional form model;

generating a plurality of lines along a surface of the three-dimensional form model by protecting horizontal lines encircling the three-dimensional form model with leaving a space to the three-dimensional form model and vertical lines intersecting the horizontal lines to the three-dimensional form model, the plurality of generated lines corresponding exactly to contours of the three-dimensional form model; and modifying the plurality of generated lines in response to a user instruction, wherein the user instruction includes at least one of an addition of at least one line in the plurality of lines, and a movement of at least one of the lines, after the modification, the plurality of lines still correspond exactly to contours of the three-dimensional form model, and both before and after the modification, any one of the plurality of lines do not cross with any one of the remaining ones of the plurality of lines.

* * * * *